United States Patent
Ohzuku et al.

(10) Patent No.: US 7,816,036 B2
(45) Date of Patent: Oct. 19, 2010

(54) POSITIVE ELECTRODE ACTIVE MATERIAL AND NON-AQUEOUS ELECTROLYTE SECONDARY CELL COMPRISING THE SAME

(75) Inventors: Tsutomu Ohzuku, Kitakatsuragi-gun (JP); Hiroshi Yoshizawa, Hirakata (JP); Masatoshi Nagayama, Hirakata (JP)

(73) Assignees: Panasonic Corporation, Osaka (JP); Osaka City University, Osaka (JP)

( * ) Notice: Subject to any disclaimer, the term of this patent is extended or adjusted under 35 U.S.C. 154(b) by 469 days.

(21) Appl. No.: 10/250,647

(22) PCT Filed: Sep. 9, 2002

(86) PCT No.: PCT/JP02/09182
§ 371 (c)(1),
(2), (4) Date: Jul. 7, 2003

(87) PCT Pub. No.: WO03/026047
PCT Pub. Date: Mar. 27, 2003

(65) Prior Publication Data
US 2004/0058243 A1    Mar. 25, 2004

(30) Foreign Application Priority Data
Sep. 13, 2001    (JP) .............................. 2001-278537

(51) Int. Cl.
H01M 4/02    (2006.01)
H01M 4/131    (2010.01)
H01M 4/139    (2010.01)

(52) U.S. Cl. ................. 429/231.1; 429/209; 429/218.1; 429/223; 429/224; 429/231.95

(58) Field of Classification Search .................. 429/223, 429/218.1, 209
See application file for complete search history.

(56) References Cited

U.S. PATENT DOCUMENTS 5,079,109 A    1/1992    Takami et al.
5,264,201 A    11/1993    Dahn et al.

(Continued)

FOREIGN PATENT DOCUMENTS

EP        0 744 780 A1    11/1996

(Continued)

OTHER PUBLICATIONS

E. Rossen, C.D.W. Jones, and J.R. Dahn. Structure and electrochemistry of LixMnyNi1-yO2. Elsevier Science Publishers B.V. 1992.*

(Continued)

Primary Examiner—Patrick Ryan
Assistant Examiner—Alix Echelmeyer
(74) Attorney, Agent, or Firm—McDermott Will & Emery LLP

(57) ABSTRACT

To provide a non-aqueous electrolyte secondary battery in which the amount of Li deposited is small and the battery surface temperature does not increase so much, a positive electrode active material comprising crystal particles of an oxide having a layered single-phase crystal structure and a composition represented by the formula (1): $LiNi_{2/3}Mn_{1/3}O_2$, wherein the arrangement of oxygen atoms constituting the oxide is a cubic close-packed structure is used.

17 Claims, 5 Drawing Sheets

U.S. PATENT DOCUMENTS

| | | | |
|---|---|---|---|
| 5,300,376 A | 4/1994 | Plichta et al. | |
| 5,370,948 A * | 12/1994 | Hasegawa et al. | 429/223 |
| 5,393,622 A | 2/1995 | Nitta et al. | |
| 5,506,077 A | 4/1996 | Koksbang | |
| 5,626,635 A | 5/1997 | Yamaura et al. | |
| 5,629,110 A | 5/1997 | Kobayashi et al. | |
| 5,631,104 A | 5/1997 | Zhong et al. | |
| 5,677,087 A | 10/1997 | Amine et al. | |
| 5,766,800 A | 6/1998 | Manev et al. | |
| 5,922,491 A | 7/1999 | Ikawa et al. | |
| 5,981,106 A | 11/1999 | Amine et al. | |
| 5,985,237 A | 11/1999 | Lu et al. | |
| 6,045,771 A | 4/2000 | Matsubara et al. | |
| 6,093,505 A | 7/2000 | Miura | |
| 6,159,637 A | 12/2000 | Shizuka et al. | |
| 6,168,887 B1 | 1/2001 | Dahn et al. | |
| 6,291,107 B1 | 9/2001 | Shimizu et al. | |
| 6,352,794 B1 | 3/2002 | Nakanishi et al. | |
| 6,436,577 B1 | 8/2002 | Kida et al. | |
| 6,482,550 B1 * | 11/2002 | Imachi et al. | 429/338 |
| 6,551,744 B1 | 4/2003 | Ohzuku et al. | |
| 6,582,854 B1 * | 6/2003 | Qi et al. | 429/231.95 |
| 6,660,432 B2 * | 12/2003 | Paulsen et al. | 429/231.3 |
| 6,808,848 B2 | 10/2004 | Nakanishi et al. | |
| 7,078,128 B2 | 7/2006 | Lu et al. | |
| 7,541,114 B2 | 6/2009 | Ohzuku et al. | |
| 2002/0045091 A1 | 4/2002 | Takekawa et al. | |
| 2002/0055045 A1 | 5/2002 | Michot et al. | |
| 2002/0081485 A1 | 6/2002 | Takekawa et al. | |
| 2002/0197533 A1 * | 12/2002 | Gao et al. | 429/231.3 |
| 2003/0054251 A1 | 3/2003 | Ohzuku et al. | |
| 2003/0082448 A1 * | 5/2003 | Cho et al. | 429/218.1 |
| 2003/0082452 A1 | 5/2003 | Ueda et al. | |
| 2003/0082453 A1 | 5/2003 | Numata et al. | |
| 2003/0087154 A1 | 5/2003 | Ohzuku et al. | |
| 2003/0170540 A1 | 9/2003 | Ohzuku et al. | |
| 2003/0207176 A1 * | 11/2003 | Yoon et al. | 429/231.5 |
| 2004/0058243 A1 | 3/2004 | Ohzuku et al. | |
| 2004/0072072 A1 * | 4/2004 | Suzuki et al. | 429/231.1 |
| 2004/0126660 A1 | 7/2004 | Ohzuku et al. | |
| 2005/0079416 A1 | 4/2005 | Ohzuku et al. | |
| 2005/0147889 A1 | 7/2005 | Ohzuku et al. | |
| 2005/0260496 A1 | 11/2005 | Ueda et al. | |
| 2006/0204847 A1 | 9/2006 | Ohzuku et al. | |
| 2007/0009424 A1 | 1/2007 | Ohzuku et al. | |

FOREIGN PATENT DOCUMENTS

| | | |
|---|---|---|
| EP | 0 806 397 A1 | 11/1997 |
| EP | 0 989 622 A1 | 3/2000 |
| EP | 1 295 851 | 3/2003 |
| EP | 1 295 854 A1 | 3/2003 |
| EP | 1 309 022 A2 | 5/2003 |
| JP | 3244314 | 10/1991 |
| JP | 05-283076 | 10/1993 |
| JP | 08-171910 A | 12/1994 |
| JP | 07-085878 | 3/1995 |
| JP | 07-320784 | 12/1995 |
| JP | 07-335261 | 12/1995 |
| JP | 08-138670 A | 5/1996 |
| JP | 08-171910 | 7/1996 |
| JP | 09-045326 | 2/1997 |
| JP | 9-69362 | 3/1997 |
| JP | 09-92285 | 4/1997 |
| JP | 09-129230 | 5/1997 |
| JP | 09-129230 A | 5/1997 |
| JP | 09-199127 | 7/1997 |
| JP | 09-231973 | 9/1997 |
| JP | 10-027609 | 1/1998 |
| JP | 10-027626 | 1/1998 |
| JP | 10-027627 | 1/1998 |
| JP | 10-69910 | 3/1998 |
| JP | 10-81521 | 3/1998 |
| JP | 10-199525 | 7/1998 |
| JP | 10-316431 A | 12/1998 |
| JP | 11-1323 A | 1/1999 |
| JP | 11-025980 | 1/1999 |
| JP | 11-60243 | 3/1999 |
| JP | 11-060246 A | 3/1999 |
| JP | 11-072544 | 3/1999 |
| JP | 11-073962 | 3/1999 |
| JP | 11-167919 A | 6/1999 |
| JP | 11-292547 A | 10/1999 |
| JP | 11-321951 | 11/1999 |
| JP | 11-339802 | 12/1999 |
| JP | 2000-082466 | 3/2000 |
| JP | 2000-113872 | 4/2000 |
| JP | 2000-133262 | 5/2000 |
| JP | 2000-149923 | 5/2000 |
| JP | 2000-340230 | 12/2000 |
| JP | 2000-348725 | 12/2000 |
| JP | 2001-185153 A | 7/2001 |
| JP | P2001-195353 A | 7/2001 |
| JP | 2001-210324 | 8/2001 |
| JP | 2001-243952 | 9/2001 |
| JP | 2002-042889 | 2/2002 |
| JP | 2002-63900 | 2/2002 |
| JP | P2002-42813 A | 2/2002 |
| JP | 2002-208441 | 7/2002 |
| JP | 2002-338250 | 11/2002 |
| JP | 2003-137555 | 5/2003 |
| KR | 10-2001-0081180 | 8/2001 |
| WO | WO 98/57386 A1 | 7/1996 |
| WO | WO 02/40404 | 5/2002 |
| WO | WO 02/40404 A1 | 5/2002 |
| WO | WO 03/075376 A1 | 12/2003 |

OTHER PUBLICATIONS

Lu et al., Supperlattice Ordering of Mn, Ni and Co in Layered Alkali Transition Metal Oxides with P2, P3 and O3 Structures. Chem. Mater. 2000, 12, 3583-3590.*

"Solid-State Redox Reactions of $LiNI_{1/2}Co_{1/2}O_2$ (R3m) for 4 Volt Secondary Lithium Cells", Ueda et. al., J. Electrochem. Soc., vol. 141, No. 8, Aug. 1994 © The Electrochemical Society, Inc. pp. 2011-2014.

Yoshio, M. et al., "Preparation and properties of $LiCo_yMn_xNi_{1-x-y}O_2$ as a chathode for lithium ion batteries," Journal of Power Sources, Aug. 17, 1998, p. 176-181, vol. 90, Elsevier.

Lu, Z. et al., "Layered $Li[Ni_xCo_{1-2x}Mn_x]O_2$ Cathode Materials for Lithium-Ion Batteries," Electrochemical and Solid-State Letters, Jun. 4, 2001, p. A200-A203, vol. 12, The Electrochemical Society, Inc.

Terada, Y. et al., "In Situ XAFS Analysis of $Li(Mn, M)_2O_4$(M=Cr, Co, Ni) 5V Cathode Materials for Lithium-Ion Secondary Batteries," Journal of Solid Sate Chemistry, Feb. 2001, p. 286-291, vol. 156 Issue 2, Academic Press.

Lu, Z. et al., Layered Cathode Materials $Li[Ni_xLi_{(1/3-2x/3)}Mn_{(2/3-x/3)}]O_2$ for Lithium-Ion Batteries.

Park, H. et al., "Relationship between Chemical Bonding Character and Electrochemical Performance in Nickel-Substituted Lithium Manganese Oxides," J. Phys. Chem., May 3, 2001, p. 4860-4866, vol. 105, American Chemical Society.

Neudecker, B.J. et al., "Lithium Manganese Nickel Oxides $Li_x(Mn_yNi_{1-y})_{2-x}O_{2-z}$," J. Electrochem. Soc., Dec. 1998, p. 4148-1459, vol. 145, No. 12, The Electrochemical Society, Inc.

Cho, T. et al., "Preparation of Layered $Li[Ni_{1/3}Mn_{1/3}Co_{1/3}]O_2$ as a Cathode for Lithium Secondary Battery by Carbonate Coprecipitation Method," Chemistry Letters, Feb. 24, 2004, p. 704-705, vol. 33 No. 6, The Chemical Society of Japan, Japan.

Ohzuku, T. et al., "Comparative Study of $LiCoO_2$, $LiNi_{1/2}Co_{1/2}O_2$ and $LiNiO_2$ for 4 Volt Secondary Lithium Cells," The Journal of The International Society of Electrochemisty, Jun. 1993, p. 1159-1167, vol. 38 No. 9, Pergamon Press.

Ohzuku, T. et al., "Why transition metal (di) oxides are the most attractive materials for batteries," Solid State Ionics, Aug. 1994, p. 202-211, vol. 69 No. 3,4, North-Holland, The Netherlands.

Ohzuku, T. et al., "Solid State Electrochemistry of Intercalation Compound of $LiAl_{1/2}Ni_{1/2}O_2$(R3m) for Lithium-Ion Batteries," Electrochemisty of Intercalation, (1998), p. 1209-1214, vol. No. 12, The Electrochemical Society of Japan, Japan.

Ohzuku, T. et al., "Synthesis and Characterization of $LiNiO_2$ (R3m) for Rechargeable Nonaqueous Cells," Chemistry Express, vol. 6, No. 3, Mar. 1991, pp. 161-164, Kinki Chemical Society, Japan.

Ohzuku, T. et al., "New Route to Prepare $LiNiO_2$ for 4-Volts Secondary Lithium Cells," Chemistry Express, vol. 7, No. 9, pp. 689-692, 1992, Kinki Chemical Society, Japan.

Ohzuku, T. et al., "Synthesis and Characterization of $LiAl_{1/4}Ni_{3/4}O_2$ R3m) for Lithium-Ion (Shuttlecock) Batteries," Journal of the Electrochemical Society, Dec. 1995, p. 4033-4039, vol. 142 No. 12, The Electorchemical Society, Inc.

Observations of a third party submitted to Japanese Patent Application No. 2000-227853 corresponding to USP 6551744.

Observations of a third party submitted to Japanese patent application No. 2002-303294 corresponding to U.S. Appl. No. 10/277,989.

Lu et al., "Superlattice Ordering of Mn, Ni, and Co in Layered Alkali Transition Metal Oxides with P2, P3, and O3 Structures," Chem. Mater, p. 3583-3590, vol. 12, American Chemical Society.

Abraham, et al., "Surface changes on $LiNi_{0.8}Co_{0.2}O_2$ particles during testing of high power lithium-ion cells," Electrochemistry Communications, May 2002, p. 620-625, vol. 4, Elsevier.

West et al., "Introduction for Solid-State Chemistry," Kodansha-Scientific, Mar. 20, 1996, with partial translation.

Yoshio et al., "Lithium-ion Secondary Battery," Nikkan Kogyo Shinbunsha, Mar. 29, 1996, with partial translation.

Saka, K, "Study of Crystal Electron microscope for researchers of material study," Uchida Rokakuho, Nov. 25, 1997, with partial translation.

Japanese Society of Microscopy, Kanto Division, "Technique of Electron microscope technique for advanced material evaluation," Asakura-shoten, Dec. 15, 1991, with partial translation.

Kato, M., "Analysis of X-ray diffraction analysis," Uchida Rokakuho, Apr. 20, 1990, with partial translation.

Wu, X., et al. "Improvement of electrochemical properties of $LiNi_{0.5}Mn_{1.5}O_4$ spinel" Department of Chemistry, Pohang University of Science and Technology, accepted Jan. 10, 2002.

Wang, G. X. et al., "Spinel $Li[Li_{1/3}Ti_{5/3}]O_4$ as an anode material for lithium ion batteries" Energy Storage Materials Program, Institute for Superconducting and Electronic Materials, University of Wollongong, accepted Apr. 27, 1999.

Ohzuku, Tsutomu., et al. "A 3-Volt Lithium-Ion Cell with $Li[Ni_{1/2}Mn_{3/2}]O_4$ and $Li[Li_{1/3}Ti_{5/3}]O_4$: A method to Prepare Stable Positive-Electrode Material of Highly Crystallized $Li[Ni_{1/2}Mn_{3/2}]O_4$" Chemistry Letters 2001, pp. 1270-1271.

Ohzuku, Tsutomu., et al. "Solid-State redox potentials for $Li[Me_{1/2}Mn_{3/2}]O_4$ (Me: 3d-transition metal) having spinel-framework structures: a series of 5 volt materials for advanced lithium-ion batteries." Journal of Power Sources pp. 90-94.

European Search Report issued in European Patent Application No. EP 03707026.5 dated Nov. 14, 2008.

Dong, Dianquan et al., "Synthesis of $LiCu_{0.5}Mn_{1.5}O_4$ and its Li+ extraction/insertion reaction in aqueous solution," Database CA [online] Chemical Abstracts Service; XP-002502577.

Ohzuku, Tsutomu et al., "Electrochemistry of Manganese Dioxide in Lithium Nonaqueous Cell," Journal of the Electrochemistry Society, vol. 137, No. 3, 1990, pp. 769-775, XP-002502572.

Shigemura, H. et al., "Structure and Electrochemical Properties of $LiFe_xMn_{2-x}O_4$ ($0 \leq x \leq 0.5$) Spinal as 5 V Electrode Material for Lithium Batteries," Journal of the Electrochemistry Society, vol. 148, No. 7, 2001, pp. A730-A736, XP-002502573.

Sigala, C. et al., "Positive electrode materials with high operating voltage for lithium batteries: $LiCr_yMn_{2-y}O_4$ ($0 \leq y \leq 1$)," Solid State Ionics, vol. 81, No. 3-4, 1995, pp. 167-170, XP-002502574.

Ohzuku, Tsutomu et al., "Synthesis and Characterization of $Li[Ni_{1/2}Mn_{3/2}]O_4$ by Twp-Step Solid State Reaction," Journal of the Ceramic Society of Japan, Vo. 110, No. 5, May 1, 2002, pp. 501-505, XP-002502575.

Kanamura, Kiyoshi et al., "Electrochemical Characteristics of $LiNi_{0.5}Mn_{1.5}O_4$ Cathodes with Ti or Al Current Collectors," Journal of the Electrochemical Society, vol. 149, No. 3, 2002, pp. A339-A345, XP-002502576.

Ariyoshi, Kingo et al., "Topotactic Two-Phase Reactions of $Li[Ni_{1/2}Mn_{3/2}]O_4$ ($P4_332$) in Nonaqueous Lithium Cells," Journal of the Electrochemistry Society, vol. 151, No. 2, 2004, pp. A296-A303, XP-002502626.

Zhong, Q. et al., "Synthesis and electrochemistry of $LiNi_xMn_{2-x}O_4$," Journal of the Electrochemistry Society, vol. 144, No. 1, 1997, pp. 205-213, XP002502571.

United States Notice of Allowance issued in U.S. Appl. No. 10/506,298 dated on Jan. 9, 2009.

Amine et al "A New Three-Volt Spinel $Li_{1+x}Mn_{1.5}NI_{0.5}O_4$ for Secondary Lithium Batteries" Journal of Electrochemical Society vol. 143, No. 5 pp. 1607-1613 The Electrochemical Society Inc, May 1996.

Chinese Office Action, w/ English translation thereof, issued in Chinese Patent Application No. CN 200710008195.4 dated Nov. 20, 2009.

United States Office Action issued in U.S. Appl. No. 11/431,919, mailed Jul. 20, 2010.

* cited by examiner

F I G. 1
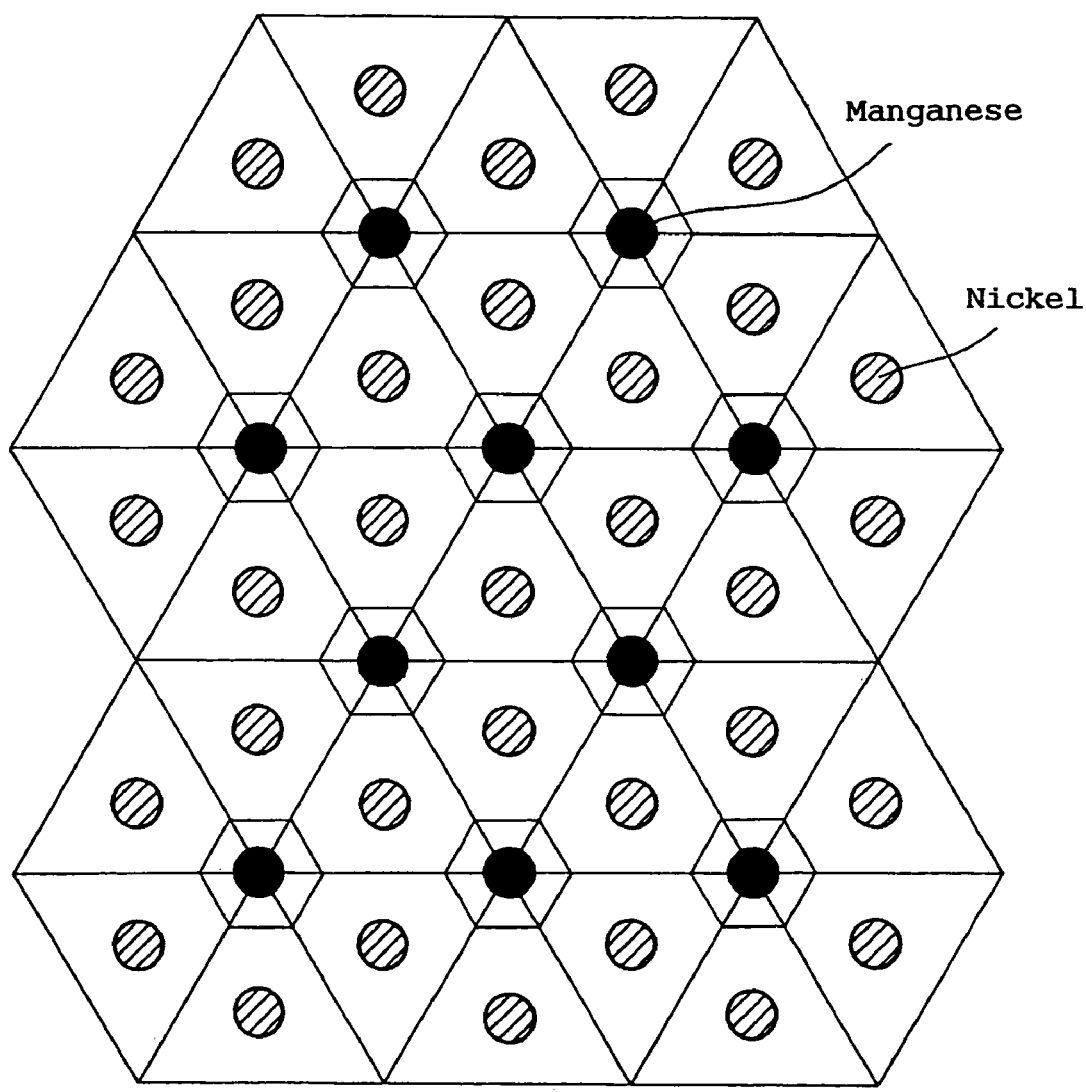

(a)

(b)

(c)

F I G. 6
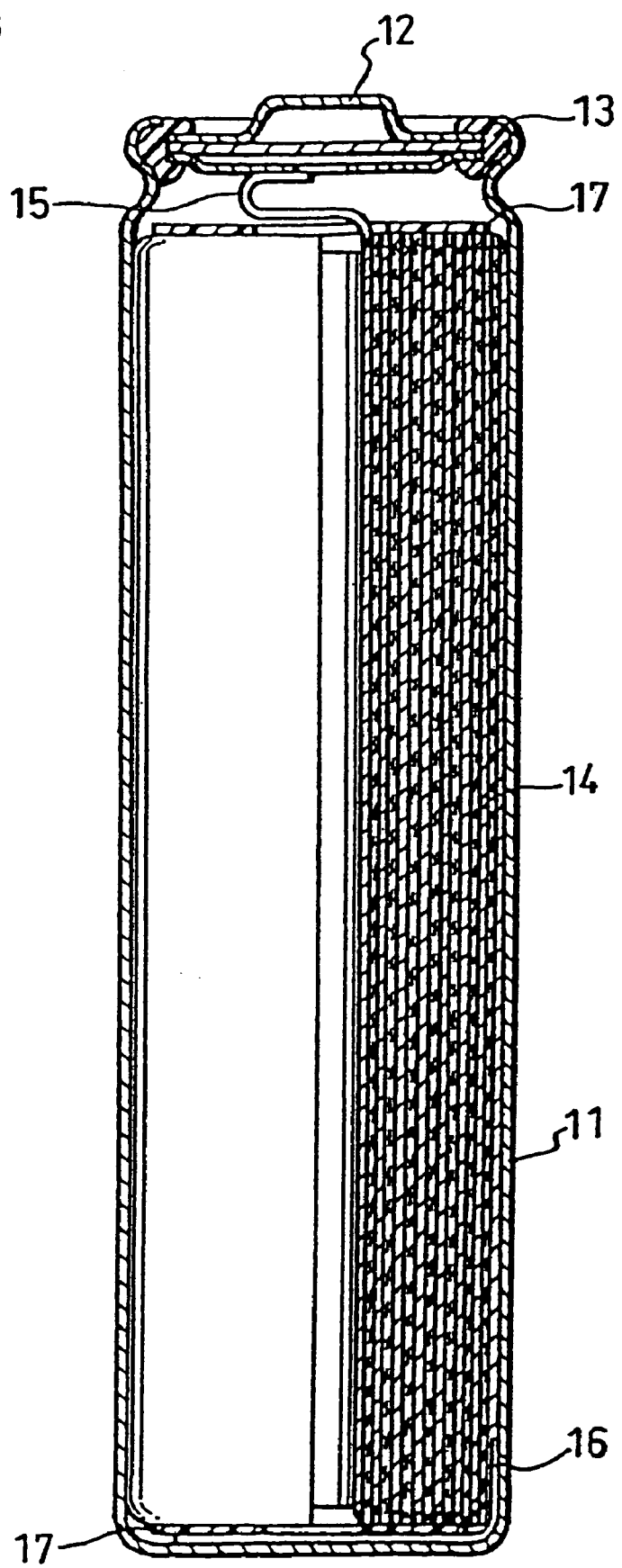

POSITIVE ELECTRODE ACTIVE MATERIAL AND NON-AQUEOUS ELECTROLYTE SECONDARY CELL COMPRISING THE SAME

TECHNICAL FIELD

The present invention relates to a positive electrode active material, particularly to a positive electrode active material for a non-aqueous electrolyte secondary battery. The present invention further relates to a high-capacity and low-cost non-aqueous electrolyte secondary battery having a positive electrode containing a specific positive electrode active material.

BACKGROUND ART

In recent years, with the widespread use of cordless and portable AV appliances, personal computers and the like, the need has been increasing for compact, light weight, and high energy density batteries as power sources for driving those appliances. In particular, lithium secondary batteries, as having high energy density, are expected to be dominant batteries in the next generation, and the potential market thereof is very large.

In most of the lithium secondary batteries currently available on the market, $LiCoO_2$ having a high voltage of 4 V is used as the positive electrode active material, but $LiCoO_2$ is costly because Co is expensive. Under such circumstances, research has been progressing to investigate various positive electrode active materials as substitutes for $LiCoO_2$. Among them, a lithium-containing transition metal oxide has been wholeheartedly researched: $LiNi_aCo_bO_2$ (a+b≈1) is promising, and it seems that $LiMn_2O_4$ having a spinel structure has already been commercialized.

In addition, nickel and manganese as substitute materials for expensive cobalt have also been under vigorous research. $LiNiO_2$ having a layered structure, for example, is expected to have a large discharge capacity, but the crystal structure of $LiNiO_2$ changes during charging/discharging, causing a great deal of deterioration thereof. In view of this, it is proposed to add to $LiNiO_2$ an element that can stabilize the crystal structure during charging/discharging and thus prevent the deterioration. As the additional element, specifically, there are exemplified cobalt, manganese, titanium and aluminum.

Moreover, prior art examples which use composite oxides of Ni and Mn as the positive electrode active material for lithium secondary batteries will be described: U.S. Pat. No. 5,393,622, for example, proposes a method in which a hydroxide of Ni, a hydroxide of Mn and a hydroxide of Li are dry-mixed together and baked and, after cooling them down to room temperature, the mixture is again heated and baked to obtain an active material having a composition represented by the formula $Li_yNi_{1-x}Mn_xO_2$ where $0≦x≦0.3$, $0≦y≦1.3$.

Further, U.S. Pat. No. 5,370,948 proposes a method in which a Li salt, a Ni salt and a Mn salt are mixed together into an aqueous solution, followed by drying and baking, to obtain an active material represented by the formula $LiNi_{1-x}Mn_xO_2$ where $0.005≦x≦0.45$.

Further, U.S. Pat. No. 5,264,201 proposes a dry synthesis method in which hydroxides or oxides of nickel and manganese and an excess amount of lithium hydroxide are mixed together and baked, and a synthesis method in which an oxides of nickel and manganese or the like are added to a saturated aqueous solution of lithium hydroxide to form a slurry, which is then dried and baked under a reduced pressure, to obtain an active material represented by the formula $Li_xNi_{2-x-y}Mn_yO_2$ where $0.8≦x≦1.0$, $y≦0.2$.

Furthermore, U.S. Pat. No. 5,629,110 proposes a dry mixing synthesis method which uses β-$Ni(OH)_2$ to obtain an active material represented by the formula $LiNi_{1-x}Mn_yO_2$ where $0<x≦0.2$, $y≦0.2$.

Japanese Laid-Open Patent Publication No. Hei 8-171910 proposes a method in which manganese and nickel are coprecipitated by adding an alkaline solution into an aqueous solution mixture of manganese and nickel, then lithium hydroxide is added to the aqueous solution mixture and the resulting mixture is baked to obtain an active material represented by the formula $LiNi_xMn_{1-x}O_2$ where $0.7≦x≦0.95$.

Further, Japanese Laid-Open Patent Publication No. Hei 9-129230 discloses a preferable particulate active material having a composition represented by the formula $LiNi_xM_{1-x}O_2$ where M is at least one of Co, Mn, Cr, Fe, V and Al, $1>x≧0.5$, and shows a material with x=0.15 as the active material containing Ni and Mn.

Further, Japanese Laid-Open Patent Publication No. Hei 10-69910 proposes an active material synthesized by a coprecipitation synthesis method, represented by the formula $Li_{y-x1}Ni_{1-x2}M_xO_2$ where M is Co, Al, Mg, Fe, Mg or Mn, $0<x_2≦0.5$, $0≦x_1<0.2$, $x=x_1+x_2$, and $0.9≦y≦1.3$. This patent publication describes that the discharge capacity is inherently small if M is Mn, and the essential function of the positive electrode active material for a lithium secondary battery intended to achieve a high capacity is dismissed if $x_2$ is more than 0.5. $LiNi_{0.6}Mn_{0.4}O_2$ is exemplified as a material having the highest proportion of Mn.

It should be noted that, although U.S. Pat. No. 5,985,237 shows a production method of $LiMnO_2$ having a layered structure, this is practically a 3 V level active material.

All of the prior art examples disclosed in the above U.S. Patents and Japanese Laid-Open Patent Publications are intended to improve the electrochemical characteristics such as the cycle characteristic of $LiNiO_2$ by adding a trace amount of an element to $LiNiO_2$, while retaining the characteristic properties of $LiNiO_2$. Accordingly, in the active material obtained after the addition, the amount of Ni is always larger than that of Mn, and the preferable proportion is considered to be Ni:Mn=0.8:0.2. As an example of a material having a proportion with a highest amount of Mn, Ni:Mn=0.55:0.45 is disclosed.

However, in any of these prior art examples, it is difficult to obtain a composite oxide having a single-phase crystal structure since $LiNiO_2$ is separated from $LiMnO_2$. This is because $Mn^{2+}$ is likely to be oxidized to $Mn^{3+}$ during coprecipitation, and $Mn^{3+}$ is unlikely to form a homogenous composite oxide with $Ni^{2+}$.

As described above, as a substitute material for the currently commercialized $LiCoO_2$ having a high voltage of 4 V, $LiNiO_2$ and $LiMnO_2$ as high-capacity and low-cost positive electrode active materials having a layered structure like $LiCoO_2$ have been researched and developed.

However, the discharge curve of $LiNiO_2$ is not flat, and the cycle life is short. In addition, the heat resistance is low, and hence the use of this material as the substitute material for $LiCoO_2$ would involve a serious problem. In view of this, improvements have been attempted by adding various elements to $LiNiO_2$, but satisfactory results have not been obtained yet. Further, since a voltage of only 3 V can be obtained with $LiMnO_2$, $LiMn_2O_4$ which does not have a layered structure but has a spinel structure with low-capacity is beginning to be researched.

Namely, required has been a positive electrode active material which has a voltage of 4V, as high as $LiCoO_2$, exhibits a flat discharge curve, and whose capacity is higher and cost is lower than $LiCoO_2$; further required has been a high-capacity non-aqueous electrolyte secondary battery with excellent charge/discharge efficiency, which uses the above positive electrode active material.

As opposed to this, Japanese Patent Application No. 2000-227858 does not propose a technique for improving the inherent characteristics of $LiNiO_2$ or those of $LiMnO_2$ by adding a new element thereto, but proposes a technique for obtaining a nickel manganese composite oxide (positive electrode active material) which represents a new function by dispersing a nickel compound and a manganese compound uniformly at the atomic level to form a solid solution.

That is to say, the prior art examples propose plenty of additional elements, but not technically clarify which elements are specifically preferred, whereas the above application proposes the positive electrode active material which can represent a new function by combining nickel and manganese at about the same ratio.

Based on the fact that it is possible to obtain a nickel manganese composite oxide which represents a new function by dispersing nickel and manganese uniformly at the atomic level to form a solid solution, the present inventors conducted extensive studies on oxides containing a variety of transition metals, the composition and the crystal structures thereof (Japanese Patent Application No. 2001-195353).

As a result, by means of a technique for forming a solid solution by uniformly dispersing the two transition metal elements (i.e. Ni and Mn) at the atomic level, the present inventors have identified the atomic arrangement of Ni and Mn and found a positive electrode active material comprising a composite oxide which represents a further new function, leading to the completion of the present invention.

DISCLOSURE OF INVENTION

The present invention relates to a positive electrode active material comprising crystal particles of an oxide having a layered single-phase crystal structure and being represented by the formula (1): $LiNi_{2/3}Mn_{1/3}O_2$, wherein the arrangement of oxygen atoms constituting the oxide is a cubic close-packed structure.

The crystal structure of the oxide is effectively a layered structure belonging to R-3m.

Further, the positive electrode active material of the present invention effectively comprises a mixture of the crystal particles of the oxide with a particle size of 0.1 to 2 μm and secondary particles of the crystal particles with a particle size of 2 to 20 μm.

Moreover, it is effective that the volume of the unit lattice of the crystal particles does not increase by an oxidation.

Furthermore, in the aforesaid oxide, the error range of the ratio of the Ni and Mn is within 10 atom %.

Additionally, it is also effective that the surface of the crystal particles is doped with a different element.

In the case where the surface of the crystal particles is doped with a different element, the different element is effectively at least one selected from the group consisting of aluminum, magnesium, calcium, strontium, yttrium and ytterbium.

The added amount of the different element is effectively 0.05 to 20 atom % of the total amount of the Ni and Mn.

It is also preferred that the arrangement of nickel element and manganese element is a superlattice arrangement of a [√3×√3] R30° in the layer, of the crystal particles, in which nickel element and manganese element exist in a ratio of 2:1.

The present invention further relates to a non-aqueous electrolyte secondary battery comprising a negative electrode containing, as a negative electrode active material, a material capable of absorbing and desorbing lithium ions and/or lithium metal, a positive electrode containing the aforesaid positive electrode active material, and an electrolyte.

The present invention can provide a non-aqueous electrolyte secondary battery with a high capacity and good charge/discharge efficiency.

BRIEF DESCRIPTION OF DRAWINGS

FIG. 1 shows a diagram schematically illustrating the arrangement of nickel and manganese atoms in a crystal particle of the oxide constituting the positive electrode active material in accordance with the present invention.

FIG. 6 shows a partially cross-sectional front view of a cylindrical battery.

BEST MODE FOR CARRYING OUT THE INVENTION

Figure 2:
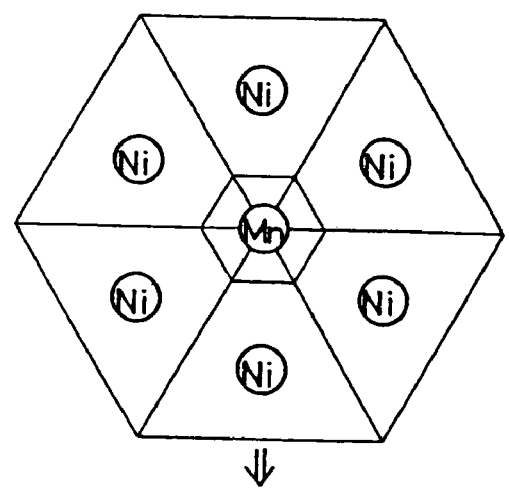
FIG. 2 shows partial views of FIG. 1 schematically illustrating that electrons are released from nickel atoms.
Figure 2:
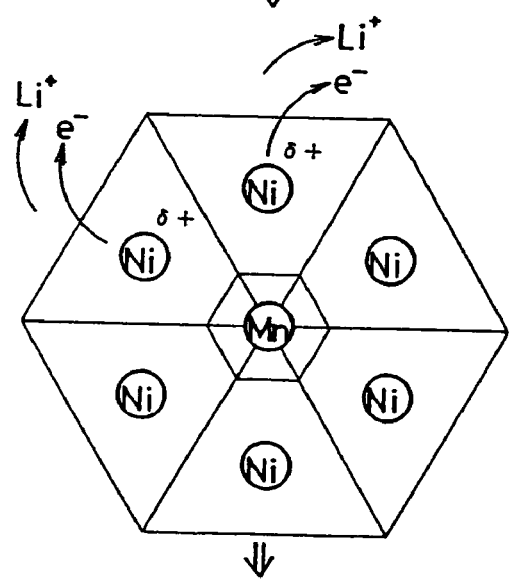
Figure 2:
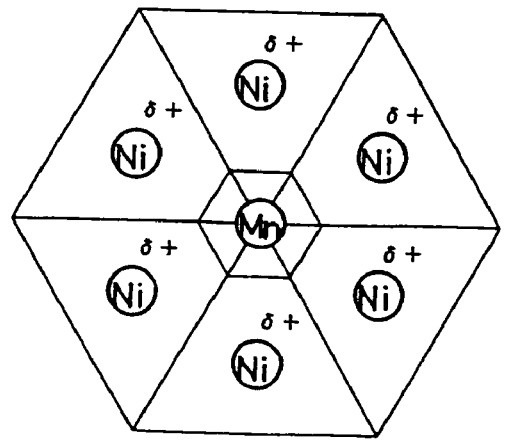

Based on the above-described prior art in which a positive electrode active material comprising a lithium nickel manganese containing oxide, which represents a new function, is obtained by dispersing nickel and manganese uniformly at the atomic level to form a solid solution, the present inventors have found that the incorporation of nickel and manganese in a specific ratio and providing with a specific structure represents another new function.

Specifically, the present invention relates to a positive electrode active material comprising crystal particles of an (composite) oxide having a layered single-phase crystal structure and a composition represented by the formula (1): $LiNi_{2/3}Mn_{1/3}O_2$, wherein the arrangement of oxygen atoms constituting the oxide is a cubic close-packed structure.

Particularly, it is of importance, from the viewpoint of composition, that nickel and manganese are incorporated at the atomic level and that the atomic ratio of these elements is substantially 2:1.

It is of importance, from the viewpoint of crystal structure, that the composite oxide has a layered structure belonging to R-3m and that two transition metal elements (i.e. nickel and manganese) are evenly arranged in 3 (a) site to constitute a superlattice of a [√3×√3] R30° in at least part or whole of the crystal particles (J. Electrochem. Soc., Vol. 141, P2010 (1994)). The present invention provides a positive electrode active material which represents a new function by realizing these points.

Besides, the doping the vicinity of the surface of the parent material (the above-mentioned crystal particles) with a trace amount of different metal element gives a new function. Even if the different element (dopant) to be added is evenly dispersed within a crystal lattice, no problem arises as long as its amount is very small; however, if the amount is large, a problem arises.

As stated in the above, since what is important is that the two transition metal elements exist evenly in 3 (a) site to form the superlattice, any amount will do as long as the formation of the superlattice is not destroyed in major part of the crystal particle. Since the different element functions particularly on the surface of the crystal particles, it is desirable that the superlattice is retained inside the crystal particle and the concentration of the different element in the vicinity of the surface be high in order to effectively obtain the effect of the different element.

For instance, the doping of the surface of the crystal particles with an aluminum element improves the heat resistance, slightly increases the potential, makes the shape of the charge/discharge curve to be flat. The doping with magnesium increases the electronic conductivity of the crystal particles. It is also possible to reduce or increase the amount of the gas generated by the reaction between the surface of the crystal particles and the electrolyte at high temperatures by using a different kind of element.

(1) Composition and Structure of Positive Electrode Active Material of the Present Invention First of all, the characteristics of the positive electrode active material of the present invention are described from the viewpoint of crystal structure.

The crystal structure of the crystal particles as the positive electrode active material of the present invention belongs to an α-NaFeO$_2$ type layered structure (R-3m). LiCoO$_2$ and LiNiO$_2$ also have a hexagonal crystal system which belongs to the above-mentioned structure. To explain it schematically, a layer constituted by lithium atoms and a layer constituted by the transition metal elements are inserted regularly in turn between the filled oxygen atoms. The transition metal elements occupy 3(a) site, but, in the oxide constituting the positive electrode active material of the present invention, nickel and manganese atoms are regularly located in this 3(a) site. FIG. 1 is a diagram schematically illustrating that the nickel and manganese atoms are regularly arranged in the 3(a) site. The detail explanation of this diagram is disclosed, for instance, in J. Electrochem. Soc., Vol. 141, P2014 (1994).

FIG. 1 indicates that the two transition metal elements are regularly arranged in one plane of a crystal lattice. Taking one manganese atom for example, every manganese atom is surrounded by nickel atoms. This means that each of the nickel atoms is arranged at an equal distance from every manganese atom at the closest point. Thereby, the two transition metal elements constitute a superlattice of [√3×√3] R30°.

It is expected that each element causes an electron interaction with each other by forming a superlattice like this to represent a new function, and the present inventors have found that the use of a combination of nickel and manganese represents such effect and that the use of the crystal particles having such superlattice effect as the positive electrode active material for a non-aqueous electrolyte battery significantly improves the characteristics of the battery obtained.

In order to confirm whether the superlattice is obtained, the following analytical methods can be used. First, as an indirect method, because the nickel elements and manganese elements are evenly dispersed in the crystal lattice of the crystal particles, an elemental analysis of the cross section of the crystal particle can be conducted by using an EPMA (X-ray microanalysis), which allows to confirm whether atoms are evenly dispersed and the possibility of the presence of a superlattice.

Alternatively, there is a direct method for confirming the presence of superlattice by the verification of a superlattice line using X-ray or electron beam diffraction.

Now, the function of the composite oxide of the present invention is described by referring to FIG. 2. FIG. 2 shows diagrams illustrating FIG. 1 partially and clearly showing the movement of atoms.

As indicated in (a) of FIG. 2, in the positive electrode active material of the present invention, each atom usually exists as trivalent on the average. When the positive electrode active material is charged, electrons are extracted from the nickel atoms arranged around the manganese atom and lithium atoms are also released, as shown in (b) of FIG. 2.

After electrons are extracted from all of the nickel atoms, the manganese atom is blocked off and isolated by the one-electron oxidized nickel atoms and isolated, as shown in (c) of FIG. 2. Because of this blocking effect, electrons are not extracted from the manganese atom. That is to say, since electrons are not extracted from the manganese atom even if the positive electrode active material of the present invention is overcharged, lithium atoms are not released excessively; therefore, in the battery, the precipitation of lithium on the negative electrode will be reduced, which is a remarkable effect.

Figure 3:
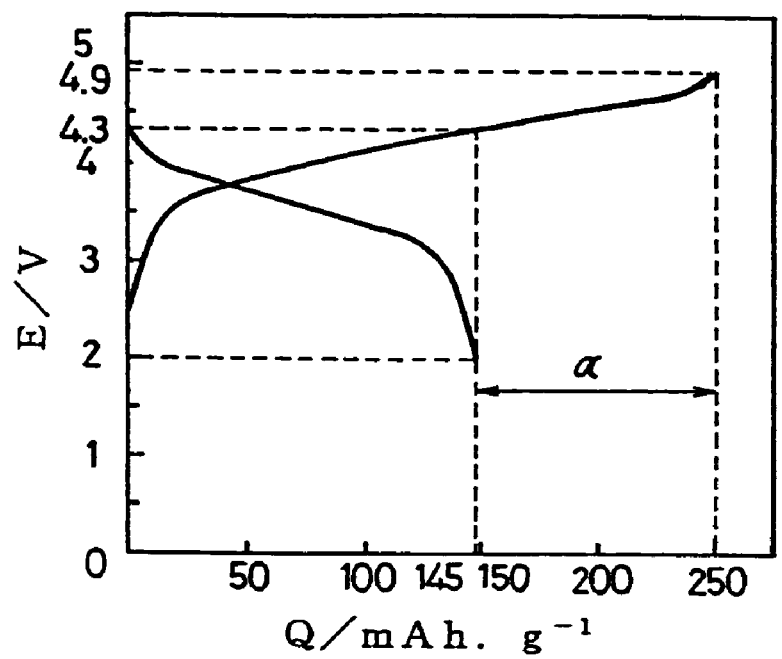
FIG. 3 shows a graph conceptually showing charge/discharge curves of $LiCoO_2$.

Then, the effect of the positive electrode active material in accordance with the present invention is explained with reference to the comparative charge/discharge curves of LiCoO$_2$ which has a layered structure. FIG. 3 conceptually shows a charge curve when LiCoO$_2$ is charged to 4.9 V, and a discharge curve when it is charged to a normal voltage of 4.3 V and discharged. Likewise, FIG. 4 conceptually shows a charge curve when the positive electrode active material of the present invention is charged to 4.9 V, and a discharge curve when it is charged to a normal voltage of 4.3 V and discharged.

In the charge/discharge to a normal voltage of 4.3 V, as shown in formula (2):

$$Li_{1.0}CoO_2 \Leftrightarrow Li_{0.5}CoO_2 + 0.5\ Li^+ + 0.5\ e^-,$$

only about half of the amount of the lithium contained in the positive electrode active material comprising a lithium-containing transition metal oxide is used. This is determined in view of the cycle stability of the positive electrode active material and the potential range in which the electrolyte exist stably. The capacity of the negative electrode is designed according to that of the positive electrode.

Hence, when it is overcharged to 4.9 V, as shown by α in FIG. 3, lithium in an amount corresponding to 105 mAh/g is released and the lithium which fails to be absorbed by the negative electrode deposits on the negative electrode.

In addition, the excessive loss of lithium enhances the reactivity with the electrolyte in the positive electrode (the oxidative decomposition of the electrolyte on the surface of the positive electrode), causing the surface temperature of the battery to rise due to a reaction heat.

Figure 4:
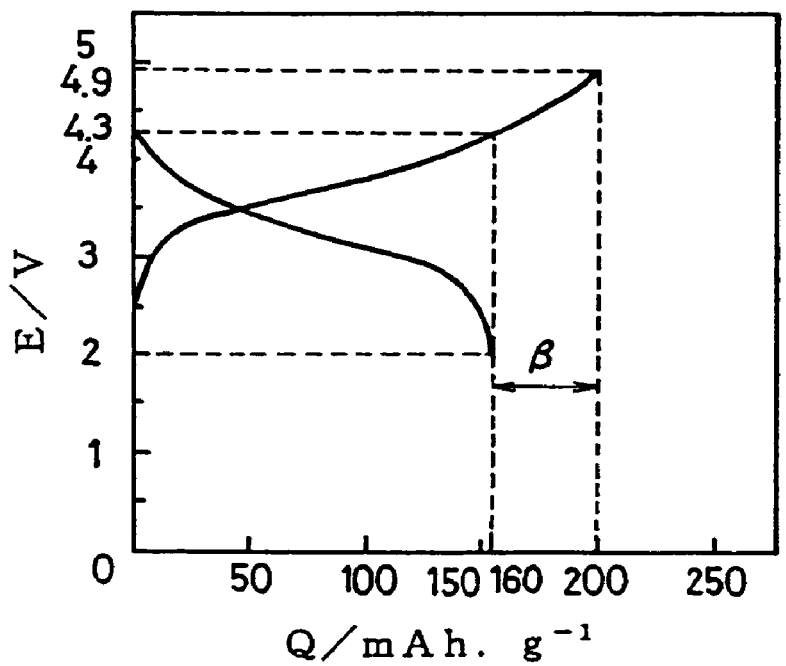
FIG. 4 shows a graph conceptually showing charge/discharge curves of the positive electrode active material of the present invention.

Unlike in the above case, in the positive electrode active material of the present invention, the above-mentioned blocking effect for manganese reduces the release of electrons and lithium atoms; specifically, lithium atoms only in an amount corresponding to 40 mAh/g are released as shown by β in FIG. 4; therefore, even if the lithium which fails to be absorbed by the negative electrode deposits, the amount of the lithium deposits can be minimized. At the same time, the reactivity with the electrolyte in the positive electrode can be reduced.

(2) Method for Producing Positive Electrode Active Material of the Present Invention A highly-developed production technique is required in order to produce the positive electrode active material comprising crystal particles of an oxide having a layered single-phase crystal structure and a composition represented by the formula (1): $LiNi_{2/3}Mn_{1/3}O_2$, which is characterized in that the arrangement of oxygen atoms constituting the oxide is a cubic close-packed structure.

First, a well-known method for producing a positive electrode active material is the dry mixing-and-baking method. A plurality of oxides and hydroxides containing transition metals are mixed, and lithium hydroxide or lithium carbonate as a lithium source is added thereto to form a mixture. The mixture is baked at an appropriate baking temperature, usually at 800 to 1000° C. However, this method is unlikely to give a single phase structure and to ensure the regular arrangement of elements at the atomic level. Insofar as a X-ray diffraction pattern is observed, for instance, the particles with a particle size of about 0.3 µm or less may give a single phase structure after subjecting them to the dry mixing-and-baking method, but the particles with a particle size of greater than about 0.3 µm are unlikely to give a single phase structure. Therefore, it is preferred to use the following wet coprecipitation method.

The method for coprecipitating nickel and manganese is disclosed in Japanese Laid-Open Patent Publication No. Hei 8-171910, and is described in detail in the specification of Japanese Patent Application No. 2000-227858. This coprecipitation method gives a hydroxide or oxide containing a plurality of transition metals by simultaneously precipitating mainly two elements by means of a neutralization reaction in an aqueous solution.

In the case of coprecipitating nickel and manganese, however, manganese is oxidized sufficiently into trivalent manganese ion even by a trace amount of oxygen dissolved in an aqueous solution because manganese is very easily oxidized. Accordingly, it is difficult to ensure the incorporation of manganese at the atomic level. When these elements are coprecipitated in the form of hydroxide or the like, $Mn_2O_3$ is added therein because dried hydroxide has a low crystallinity.

In order to solve the above problems, it is preferred, in the present invention, to remove the dissolved oxygen by bubbling nitrogen or argon, both of which are inert gases, in the aqueous solution, or to add a reducing agent into the aqueous solution in advance.

Figure 5:
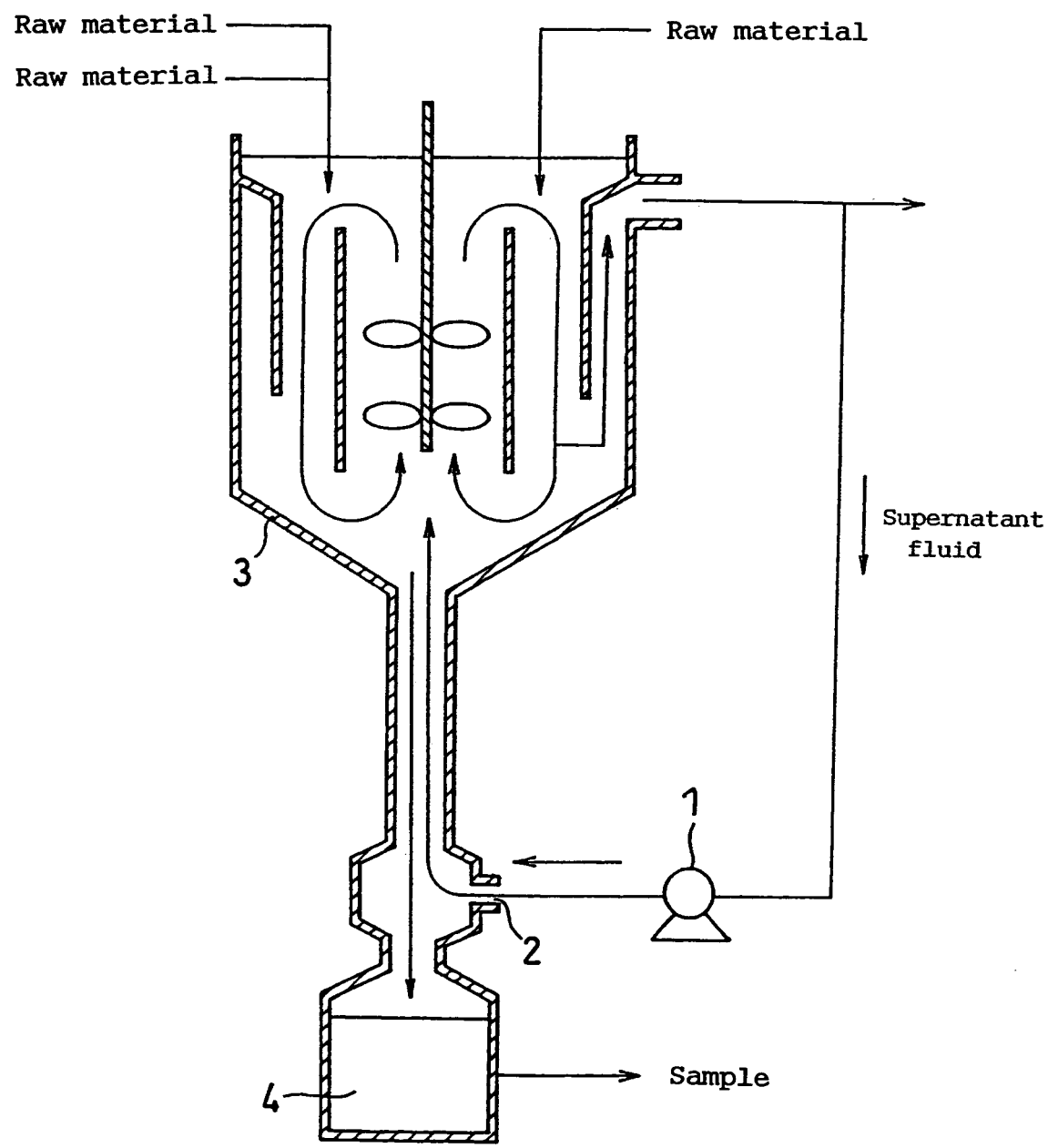
FIG. 5 shows a diagram illustrating the structure of the equipment used for the coprecipitation method in the present invention.

Therefore, the difference between the coprecipitation method to obtain the positive electrode active material of the present invention and the conventional coprecipitation method is that the method of the present invention is performed in an inert atmosphere. In order to obtain a higher-density composite oxide in spherical form with a larger particle size, the following operation is preferably performed using the equipment shown in FIG. 5. FIG. 5 is a diagram illustrating the structure of the equipment used for the coprecipitation method of the present invention.

In the equipment shown in FIG. 5, a mixed solution is introduced from a supply inlet 2 using a pump 1 to a reaction vessel 3. The mixed solution flowed upward from the lower part of the reaction vessel 3 is allowed to have a collision with falling fine crystals obtained by coprecipitation. A collecting portion 4 for the crystals obtained is provided in the lower part of the equipment. Accordingly, the crystal particles which grow to some extent and increase their specific gravity precipitate out to reach the collecting portion 4 placed in the lower part, but ungrown crystal particles do not reach the collecting portion because they are pushed back by the force of the solution flown from the lower part.

This method can give a high-density hydroxide or oxide with a large particle size of 10 to 20 µm and a tap density of 2.2 g/cm³. Examples of the raw materials include nickel sulfate, manganese sulfate and cobalt sulfate. For example, it is preferred to simultaneously feed a mixed solution of a 1.2 mol/liter $NiSO_4$ aqueous solution, a 1.2 mol/liter $MnSO_4$ aqueous solution and a 1.2 mol/liter $CoSO_4$ aqueous solution; a 4.8 mol/liter NaOH aqueous solution; and a 4.8 mol/liter $NH_3$ solution into the reaction vessel at a flow rate of 0.5 milliliter/min.

Subsequently, the obtained hydroxide or oxide is mixed with lithium hydroxide or lithium carbonate as lithium source to produce a mixture, which is then baked to give a lithium-containing transition metal oxide represented by the formula (1):

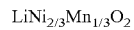

as the positive electrode active material. In this case, lithium hydroxide can be used as lithium source. When lithium hydroxide is used, first, lithium hydroxide melts at a relatively low temperature and lithium is supplied into the particles of nickel manganese hydroxide; then, with the increase of the temperature, an oxidation reaction takes place gradually from the outer side of the particles. Therefore, it is ideal to use lithium hydroxide.

When lithium carbonate is used, on the other hand, a decarboxylation reaction is required to occur first and the reaction takes place at a higher temperature as compared to the case of using lithium hydroxide. Since the decarboxylation reaction and the oxidation reaction takes place almost simultaneously, lithium hydroxide is more advantageous in terms of controlling the shape of particles and crystallinity. In other words, the use of lithium carbonate can give the intended single phase structure, but lithium hydroxide is more advantageous in terms of controlling the shape of particles and crystallinity.

Next, the preferred baking conditions are explained.

A hydroxide or oxide containing nickel and manganese is thoroughly dry-mixed with lithium hydroxide. When mixing, it is ideal that lithium hydroxide and the hydroxide or oxide be mixed such that the atomic ratio of Li, Ni and Mn satisfies the equation: Li/(Ni+Mn)=1. However, it is also possible to slightly increase or decrease each amount in order to control the baking temperature and the shape of the particles. For example, when the baking temperature is high, or when large primary particles which are obtained after baking are necessary, the amount of lithium is slightly increased for the mixing. In this case, fluctuations of about 3% are preferred.

For instance, a hydroxide or oxide obtained by coprecipitation is dry-mixed with lithium hydroxide, which is then quickly heated to 1000° C. and baked at that temperature for 10 hours. In order to decrease the temperature after the completion of the baking, the mixture is annealed at 700° C. for 5 hours, and then gradually cooled down. It is presumed that, in case of baking the oxide, the oxygen of the oxide tends to be depleted if the temperature exceeds 1000° C. With a view to preventing the oxygen loss, the step of annealing at 700° C. is preferably introduced after the completion of the baking in order to regain the lost oxygen. When annealing, the effect of annealing can be enhanced by blowing oxygen or the like.

The positive electrode active material of the present invention can be obtained according to the above; additionally, it is also possible, in the present invention, to offer an added value by adding a new different element (additonal element or dopant) to the crystal particles of the lithium-containing transition metal oxide containing nickel and manganese.

Therefore, what is important is that the positive electrode active material of the present invention contains nickel and manganese substantially at an atomic ratio of 2:1, and other new different element may be contained as long as most crystal particles of the oxide have the aforesaid crystal structure and its function is not impaired. Particularly, since the crystal particle is in the form of grain, it is practical to include such additional element in the vicinity of the surface thereof. All variations such as the positive electrode active material having an additional function by such additional element are intended to be within the scope of the present invention.

Examples of the different element include aluminum, magnesium, calcium, strontium, yttrium and ytterbium.

Doping with aluminum slightly increases the potential of the positive electrode active material and, at the same time, improves the thermal stability. In this case, an appropriate amount of aluminum source such as aluminum hydroxide is simultaneously added when an eutectic oxide of nickel and manganese obtained by the aforesaid coprecipitation is mixed with lithium hydroxide, which is then baked. Thereby, aluminum is not evenly absorbed into the inside of the eutectic oxide particle as a whole; hence, the aluminum concentration in the vicinity of the surface of the particles becomes high.

This can be confirmed by a characteristic X-ray analysis of the particles and the like. According to the doping, the parent material of the crystal particles constituting the positive electrode active material can maintain the effect of the superlattice of nickel and manganese, and the aforesaid effect can be offered because only the state of the surface of the crystal particles changes.

Parenthetically, although aluminum may be dispersed evenly into the crystal particles, it is effective to distribute aluminum somewhat unevenly on the surface because the effect of the superlattice decreases as the added amount of aluminum increases. Strontium, yttrium and the like can also add the effect of improving the heat resistance.

The addition of magnesium can increase the electronic conductivity of the positive electrode active material by one or two digits. Similar to the above, magnesium hydroxide is mixed with the eutectic oxide of nickel and manganese, and lithium hydroxide, which is then baked. The baking is performed according to the method describe above. When thus-obtained positive electrode active material is applied to a battery, the amount of the electrically conductive material can be reduced because the electronic conductivity is extremely high; thus, the increase in capacity and the like can be expected.

The added amount of these different elements is effectively within the range of 0.05 to 20 atom % of the total amount of the three transition metals. If the amount is less than 0.05 atom %, the sufficient effect cannot be obtained; on the contrary, if it is over 20 atom %, a disadvantage such as the decrease in capacity arises.

(3) Non-aqueous Electrolyte Secondary Battery

In the following, a description is given of other constituent materials that can be used when fabricating a non-aqueous electrolyte (lithium) secondary battery using the positive electrode active material of the present invention.

The electrically conductive material used in the positive electrode material mixture for the production of the positive electrode of the present invention is not limited to a particular material, and any electronically conductive material can be used as long as the material does not cause any chemical change in the fabricated battery. Examples include: graphites such as natural graphite (scale graphite and the like) and artificial graphite; carbon blacks such as acetylene black, Ketjen black, channel black, furnace black, lamp black and thermal black; electrically conductive fibers such as carbon fiber and metallic fiber; metallic powders such as carbon fluoride powder, copper powder, nickel powder, aluminum powder and silver powder; electrically conductive whiskers such as zinc oxide whisker and potassium titanate whisker; electrically conductive metal oxides such as titanium oxide; and electrically conductive organic materials such as polyphenylene derivatives. These materials can be used alone or in any combination thereof within the scope that does not impair the effect of the present invention.

Among them, artificial graphite, acetylene black and nickel powder are particularly preferable. The amount of the electrically conductive material to be added is not particularly specified, but from 1 to 50 wt % is preferable, and most preferably from 1 to 30 wt %. In the case of carbon and graphite, from 2 to 15 wt % is particularly preferable.

The preferred binder used in the positive electrode material mixture of the present invention is a polymer having a decomposition temperature of 300° C. or higher. Examples include polyethylene, polypropylene, polytetrafluoroethylene (PTFE), polyvinylidene fluoride (PVDF), tetrafluoroethylenehexafluoroethylene copolymer, tetrafluoroethylene-hexafluoropropylene copolymer (FEP), tetrafluoroethyleneperfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, and vinylidene fluoride-perfluoromethyl vinyl ether-tetrafluoroethylene copolymer. These materials can be used alone or in any combination thereof within the scope that does not impair the effect of the present invention.

Among them, polyvinylidene fluoride (PVDF) and polytetrafluoroethylene (PTFE) are most preferable.

As the current collector for the positive electrode, any electronic conductor can be used as long as the conductor does not cause any chemical change in the fabricated battery. Examples of the material, which constitute the current collector, include stainless steel, nickel, aluminum, titanium, various alloys or carbons, as well as a composite material such as aluminum or stainless steel with the surface thereof treated with carbon, nickel, titanium or silver.

Among them, aluminum or an aluminum alloy is preferable. The surface of these materials may be treated with oxidization. Alternatively, the surface of the current collector may be roughened by surface treatment. As for the current collector shape, any shape commonly employed in the field of batteries can be used. Examples of the shape include a foil, a film, a sheet and a net, a punched sheet, a lath body, a porous body, a foamed body, fibers and a non-woven fabric. The thickness is not particularly specified, but the thickness of from 1 to 500 µm is preferable.

As the negative electrode material used in the present invention, any compound can be used as long as the compound absorb and desorb lithium ions; examples include lithium, lithium alloy, alloy, intermetallic compounds, carbon, organic compounds, inorganic compounds, metal complexes and organic polymer compounds. These materials can be used alone or in any combination thereof within the scope that does not impair the effect of the present invention.

Examples of the lithium alloys include Li—Al based alloys, Li—Al—Mn based alloys, Li—Al—Mg based alloys, Li—Al—Sn based alloys, Li—Al—In based alloys, Li—Al—Cd based alloys, Li—Al—Te based alloys, Li—Ga based alloys, Li—Cd based alloys, Li—In based alloys, Li—Pb based alloys, Li—Bi based alloys, Li—Mg based alloys. In this case, the lithium content is preferably 10 wt % or higher.

As the alloy and intermetallic compounds, there are a compound of a transition metal and silicon, a compound of a transition metal and tin and the like. Particularly, a compound of nickel and silicon is preferred.

As the carbonaceous materials, there are coke, pyrolytic carbon, natural graphite, artificial graphite, mesocarbon microbeads, graphite mesophase particles, gas phase grown carbon, vitrified carbons, carbon fiber (polyacrylonitrile type, pitch type, cellulose type and gas phase grown carbon), amorphous carbon and carbons obtained by baking organic materials. These materials can be used alone or in any arbitrary combination thereof within the scope that does not impair the effect of the present invention. Among them, graphite materials such as graphite mesophase particles, natural graphite, and artificial graphite are preferable.

It is to be noted that the carbonaceous material may contain, in addition to carbon, a different element or a compound such as O, B, P, N, S, SiC and $B_4C$. The content thereof is preferably from 0 to 10 wt %.

As the inorganic compound, there are a tin compound and a silicon compound, and as the inorganic oxide, there are titanium oxide, tungsten oxide, molybdenum oxide, niobium oxide, vanadium oxide and iron oxide.

As the inorganic chalcogenide, there are, for example, iron sulfide, molybdenum sulfide and titanium sulfide.

As the organic polymer compound, there are, for example, polymer compound such as polythiophene and polyacetylene, and as the nitride, there are, for example, cobalt nitride, copper nitride, nickel nitride, iron nitride and manganese nitride.

These negative electrode materials may be used in combination; for example, a combination of carbon and an alloy or a combination of carbon and an inorganic compound is possible.

The average particle size of the carbon material used in the present invention is preferably from 0.1 to 60 μm, and more preferably from 0.5 to 30 μm. The specific surface is preferably from 1 to 10 $m^2/g$. In terms of crystal structure, graphite having a hexagonal lattice spacing ($d_{002}$) of carbon is from 3.35 to 3.40 Å and a size (LC) of the crystalline in the c-axis direction of 100 Å or larger, is preferable.

In the present invention, since the positive electrode active material includes Li, a negative electrode material (carbon or the like) that does not include Li can be used. However, it is preferred to add a small amount of Li (about 0.01 to 10 parts by weight per 100 parts by weight of the negative electrode material) into such a negative electrode material with no Li, because if part of Li becomes inactive by reacting with the electrolyte, for example, it can be supplemented with the Li added in the negative electrode material.

In order to add Li into the negative electrode material described above, for instance, melt lithium metal obtained by heating is applied onto the negative electrode material attached to the current collector; alternatively, lithium metal is attached to the electrode group by pressing in advance and Li is electrochemically added into the negative electrode material.

Similar to the case of the electrically conductive material used in the positive electrode material mixture, the electrically conductive material used in the negative electrode material mixture is not limited to a particular material, and any electronically conductive material can be used as long as the material does not cause any chemical change in the fabricated battery. When the carbonaceous material is used as the negative electrode material, it is unnecessary to add the electrically conductive material thereto because the carbonaceous material itself has electronic conductivity.

As the binder used in the negative electrode material mixture, either a thermoplastic resin or a thermosetting resin can be used, and the preferred binder is a polymer having a decomposition temperature of 300° C. or higher.

Examples of the binder include polyethylene, polypropylene, polytetrafluoroethylene (PTFE), polyvinylidene fluoride (PVDF), styrene-butadiene rubber, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer and vinylidene fluoride-perfluoromethyl vinyl ethertetrafluoroethylene copolymer. Among them, styrene-butadiene rubber and polyvinylidene fluoride are preferred, and most preferably styrene-butadiene rubber.

The material of the current collector for the negative electrode is not limited to a particular material, and any electronic conductor can be used as long as the conductor does not cause any chemical change in the fabricated battery. As the material constituting the current collector, examples include stainless steel, nickel, copper, titanium, and carbon, as well as a material such as copper or stainless steel with the surface treated with carbon, nickel, titanium or silver, or an Al—Cd alloy. Among them, copper or a copper alloy is preferred. The surface of these materials may be treated with oxidization. Alternatively, the surface of the collector may be roughened to form convex and concave by surface treatment.

As for the current collector shape, a foil, a film, a sheet, a net, a punched sheet, a lath body, a porous body, a foamed body, or fiber molding can be used, as in the case for the above positive electrode. The thickness is not particularly specified, but the thickness between 1 μm and 500 μm is preferable.

In addition to the electrically conductive material and the binder, a filler, a dispersing agent, an ion conducting material, a pressure reinforcing agent, and other various additives may be added into the electrode material mixture. Any fibrous material can be used for the filler as long as it does not cause any chemical change in the fabricated battery. Usually, an olefin polymer fiber such as polypropylene or polyethylene, a glass fiber or a carbon fiber is used. The amount of the filler to be added is not particularly specified, but from 0 to 30 wt % is preferable.

The positive and negative electrodes used in the present invention may have, in addition to the mixture layer containing the positive electrode active material or negative electrode material, other layers such as a base coat layer intended to improve the adhesion between the current collector and the mixture layer, the electrical conductivity, the cycle characteristics, and the charge/discharge efficiency, and a protective layer intended for mechanical and chemical protection of the mixture layer. The base coat layer and the protective layer may contain a binder or electrically conductive particles or electrically non-conductive particles.

As the separator, an insulating microporous thin film having large ion permeability and a specified mechanical strength is used. Preferably, the film has the function of closing the pores and increasing the resistance at a temperature of 80° C. or higher. A sheet or non-woven fabric made of an olefin polymer such as polypropylene or polyethylene alone or in combination thereof, or made of glass fiber is used in view of the resistance thereof to an organic solvent and hydrophobicity.

It is desirable that the pore diameter of the separator be small enough to prevent the active material, the binder, the electrically conductive material and the like separated from the electrode sheet from passing through the separator; specifically, a diameter of from 0.1 to 1 μm is desirable. As for the separator thickness, a thickness of from 10 to 300 μm is usually preferable. Porosity is determined in accordance with the electron or ion permeability, the material used, the film thickness and the like, and generally a porosity of from 30 to 80% is desirable. Further, when a flame retardant or nonflammable material such as glass or metal oxide film is used, the safety of the battery is further enhanced.

The non-aqueous electrolyte used in the present invention comprises a solvent and a lithium salt dissolved in the solvent. The preferable solvent is one ester or an ester mixture. Above all, cyclic carbonates, cyclic carboxylic acid esters, non-cyclic carbonates, aliphatic carboxylic acid esters and the like are preferred. Further, solvent mixtures containing cyclic carbonates and non-cyclic carbonates, solvent mixtures containing cyclic carboxylic acid esters, and solvent mixtures containing cyclic carboxylic acid esters and cyclic carbonates are preferred.

Examples of the solvent and other solvent to be used in the present invention are described below.

As the ester used as the non-aqueous solvent, there are cyclic carbonates such as ethylene carbonate (EC), propylene carbonate (PC), butylene carbonate (BC) and vinylene carbonate (VC), non-cyclic carbonates such as dimethyl carbonate (DMC), diethyl carbonate (DEC), ethyl methyl carbonate (EMC), and dipropyl carbonate (DPC), aliphatic carboxylic acid esters such as methyl formate (MF), methyl acetate (MA), methyl propionate (MP) and ethyl propionate (MA), and cyclic carboxylic acid esters such as γ-butyrolactone (GBL).

As the cyclic carbonate, EC, PC, VC and the like are particularly preferred; as the cyclic carboxylic acid ester, GBL and the like are particularly preferred; and as the non-cyclic carbonate, DMC, DEC, EMC and the like are preferred. Further, aliphatic carboxylic acid esters may also be preferably used, if occasion demands. The amount of the aliphatic carboxylic acid ester is preferably 30% or less of the total weight of the solvent, and most preferably 20% or less.

The solvent in the electrolyte solution of the present invention may contain a well-known aprotic organic solvent, in addition to the above ester in an amount of 80% or more.

As the lithium salt dissolved in the solvent, for example, there are $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, chloroborane lithium, lithium tetraphenyl borate, and imides such as $LiN(CF_3SO_2)(C_2F_5SO_2)$, $LiN(CF_3SO_2)_2$, $LiN(C_2F_5SO_2)_2$ and $LiN(CF_3SO_2)(C_4F_9SO_2)$. These salts can be used in the electrolyte solution alone or in any combination thereof within the scope that does not impair the effect of the present invention. Among them, it is particularly preferable to add $LiPF_6$.

For the non-aqueous electrolyte solution used in the present invention, an electrolyte solution containing at least ethylene carbonate and ethyl methyl carbonate, and containing $LiPF_6$ as a lithium salt, is particularly preferable. An electrolyte containing GBL as the main solvent is also preferred, and in this case, it is preferable to add an additive such as VC in an amount of several %, and to use a salt mixture of $LiBF_4$ and $LiN(C_2F_5SO_2)_2$ as the lithium salt instead of $LiPF_6$.

The amount of the electrolyte used in the battery is not particularly specified, but a suitable amount should be used according to the amounts of the positive electrode active material and the negative electrode material and the size of the battery. The amount of the lithium salt to be dissolved in the non-aqueous solvent is not particularly specified, but the preferred amount is 0.2 to 2 mol/l, and most preferably from 0.5 to 1.5 mol/l.

In order to obtain good charge/discharge characteristics, an organic additive such as 2-methylfuran, thiophene, pyrrole, aniline, crown ether, pyridine, triethylphosphite, triethanolamine, cyclic ether, ethylene diamine, n-glyme, triamide hexaphosphate, nitrobenzene derivative and nitrogen-containing aromatic heterocyclic compound may be dissolved in the above electrolyte solution. This electrolyte solution is usually impregnated or filled into the separator comprising, for example, a porous polymer, glass filter, or non-woven fabric before use.

In order to make the electrolyte solution nonflammable, a halogen-containing solvent such as carbon tetrachloride or chlorotrifluoroethylene may be added into the electrolyte solution. Also, carbon dioxide gas may be added into the electrolyte solution in order to confer suitability for high temperature storage.

Instead of the liquid electrolyte, the following solid electrolyte can also be used. The solid electrolyte is classified into inorganic or organic solid electrolyte.

As the inorganic solid electrolyte, nitrides of Li, halides of Li, and oxysalt of Li are well known. Among them, $Li_4SiO_4$, $Li_4SiO_4$-LiI—LiOH, $xLi_3PO_4$-$(1-x)Li_4SiO_4$, $Li_2SiS_3$, $Li_3PO_4Li_2S$—$SiS_2$ and phosphorus sulfide compound are effectively used.

As the organic solid electrolyte, for instance, polymer materials such as polyethylene oxide, polypropylene oxide, polyphosphazone, polyaziridine, polyethylene sulfide, polyvinyl alcohol, polyvinylidene fluoride, polyhexafluoropropylene, and the derivative, the mixture and the complex thereof are effectively used.

It is also possible to use a gel electrolyte formed by impregnating the organic solid electrolyte with the above non-aqueous liquid electrolyte. As the organic solid electrolyte, polymer matrix materials such as polyethylene oxide, polypropylene oxide, polyphosphazone, polyaziridine, polyethylene sulfide, polyvinyl alcohol, polyvinylidene fluoride, polyhexafluoropropylene, and the derivatives, the mixtures and the complexes thereof, are effectively used. In particular, a copolymer of vinylidene fluoride and hexafluoropropylene and a mixture of polyvinylidene fluoride and polyethylene oxide are preferable.

As for the shape of the battery, any type such as coin type, button type, sheet type, cylindrical type, flat type and rectangular type can be used. In the case of a coin or button type battery, the positive electrode active material mixture and negative electrode active material mixture are compressed into the shape of a pellet for use. The thickness and diameter of the pellet should be determined according to the size of the battery.

In the case of a sheet, cylindrical or rectangular type battery, the material mixture containing the positive electrode active material or the negative electrode material is usually applied (for coating) onto the current collector, and dried and compressed for use. A well-known applying method can be used such as a reverse roll method, direct roll method, blade method, knife method, extrusion method, curtain method, gravure method, bar method, casting method, dip method, and squeeze method. Among them, the blade method, knife method, and extrusion method are preferred.

The application is conducted preferably at a rate of from 0.1 to 100 m/min. By selecting the appropriate applying method according to the solution properties and drying characteristics of the mixture, an applied layer with good surface condition can be obtained. The application of the material mixture to the current collector can be conducted on one side of the current collector or on the both sides thereof at the same time. The applied layers are preferably formed on both sides of the current collector, and the applied layer on one side may be constructed from a plurality of layers including a mixture layer. The mixture layer contains a binder and an electrically conductive material, in addition to the material responsible for the absorbing and desorbing lithium ions, like the positive electrode active material or negative electrode material. In addition to the mixture layer, a layer containing no active material such as a protective layer, a base coat layer formed on the current collector, and an intermediate layer formed between the mixture layers may be provided. It is preferred that these layers having no active material contain electrically conductive particles, insulating particles, a binder and the like.

The application may be performed continuously or intermittently or in such a manner as to form stripes. The thickness, length, and width of the applied layer is determined according to the size of the battery, but the thickness of one face of the applied layer which is dried and compressed is preferably 1 to 2000 μm.

As the method for drying or dehydrating the pellet and sheet of the material mixture, any conventional method can be used. In particular, the preferred methods are heated air, vacuum, infrared radiation, far infrared radiation, electron beam radiation and low humidity air, and they can be used alone or in any combination thereof.

The preferred temperature is in the range of 80 to 350° C., and most preferably 100 to 250° C. The water content of the battery as a whole is preferably 2000 ppm or less, and the water content for the positive electrode material mixture, negative electrode material mixture and electrolyte is preferably 500 ppm or less in view of the cycle characteristics.

For the sheet pressing method, any conventional method can be used, but a mold pressing method or a calender pressing method is particularly preferred. The pressure for use is not particularly specified, but from 0.2 to 3 t/cm$^2$ is preferable. In the case of the calender pressing method, a press speed is preferably from 0.1 to 50 m/min.

The pressing temperature is preferably between room temperature and 200° C. The ratio of the width of the positive electrode sheet to that of the negative electrode sheet is preferably at 0.9 to 1.1, and more preferably at 0.95 to 1.0. The content ratio of the positive electrode active material to the negative electrode material cannot be specified because it differs according to the kind of the compound used and the formulation of the mixture, but those skilled in the art would set an optimum value considering the capacity, cycle characteristics and safety.

It is not necessary that the wound electrode structure in the present invention be in a true cylindrical shape; it may be in any shape such as an elliptic cylinder whose cross section is an ellipse or a rectangular column having a prismatic shape or a rectangular face.

FIG. 6 shows a cross-sectional front view of a cylindrical battery.

An electrode assembly 14 obtained by spirally winding positive and negative electrode plates with a separator interposed therebetween is housed in a battery case 11. A positive electrode lead 15 attached to the positive electrode plate is connected to a sealing plate 12, and a negative electrode lead 16 attached to the negative electrode plate is connected to the bottom of the battery case 11. The battery case and the lead plate can be formed using a metal or alloy with electronic conductivity and chemical resistance to organic electrolyte. For example, a metal such as iron, nickel, titanium, chromium, molybdenum, copper, aluminum, or an alloy made of these metals can be used. In particular, it is most preferable to use a stainless steel plate or a processed Al—Mn alloy plate for the battery case, aluminum for the positive electrode lead, and nickel for the negative electrode lead. It is also possible to use various engineering plastics or the combination of the engineering plastic and the metal for the battery case in order to reduce the weight of the battery.

Insulating rings 17 are respectively provided on both top and bottom of the electrode assembly 14. Subsequently, an electrolyte is charged thereinto, and the battery case is sealed by using the sealing plate. When sealing the case, the sealing plate can be provided with a safety valve. Instead of the safety valve, it may be provided with a conventional safety device. For instance, as an overcurrent-preventing device, fuse, bimetal, PTC device or the like is used. Besides a safety valve, as a method for preventing the internal pressure of the battery case from increasing, making a notch in the battery case, cracking the gasket or the sealing plate, or cutting the lead plate can be employed. Alternatively, a protective circuit including a means for preventing overcharge and overdischarge may be contained in a charger, or may be independently connected to the battery.

In order to prevent overcharge, a method to interrupt the electric current by the increase of the internal pressure of the battery can be used. In this method, a compound capable of increasing the internal pressure can be added into the mixture or the electrolyte. For the compound which increases the internal pressure, carbonate such as $Li_2CO_3$, $LiHCO_3$, $Na_2CO_3$, $NaHCO_3$, $CaCO_3$ and $MgCO_3$ can be used. As the method for welding the cap, the battery case, the sheet and the lead plate, any well-known method (i.e. AC or DC electric welding, laser welding or ultrasonic welding) can be used. For the sealing agent for sealing, a conventionally well-known compound such as asphalt or mixture can be used.

The following describes the present invention by using examples, but the present invention is not limited to these examples.

EXAMPLE 1 AND COMPARATIVE EXAMPLES 1 TO 2

First, the positive electrode active material of the present invention (Example) and the positive electrode active material for comparison (Comparative Example) were produced in the following manner. A mixed solution of a 2.4 mol/liter nickel sulfate aqueous solution and a 1.2 mol/liter manganese sulfate aqueous solution, a 4.8 mol/liter NaOH aqueous solution and 4.8 mol/liter $NH_3$ solution were introduced, at a flow rate of 0.5 milliliter/min, into the reaction vessel 3 of the equipment shown in FIG. 5, and a nickel manganese hydroxide was obtained by the coprecipitation method. Thereafter, the obtained hydroxide was baked at 400° C. for 5 hours to give an oxide containing nickel and manganese at a ratio of 2:1.

The obtained oxide and lithium hydroxide were mixed such that the atomic ratio of Li, Ni and Mn satisfies the equation: Li/(Ni+Mn)=1, which was then quickly heated to 1000° C. and baked at that temperature for 10 hours. In order to decrease the temperature after the baking, the mixture was annealed at 700° C. for 5 hours, which was then gradually cooled down to give a positive electrode active material 1 ($LiNi_{2/3}Mn_{1/3}O_2$) of the present invention composed of a lithium-containing transition metal oxide (Example 1). It was confirmed, by powder X-ray diffraction, that this positive electrode active material had a layered crystal structure and that the arrangement of oxygen atoms constituting the oxide was a cubic close-packed structure. It was also found, from the analysis of the cross section of the crystal particle using an EPMA (X-ray microanalysis), that manganese and nickel were evenly dispersed.

Manganese oxyhydroxide (MnOOH), nickel hydroxide ($Ni(OH)_2$) and lithium hydroxide (LiOH) were mixed in a predetermined molar ratio to form a mixture; the obtained mixture was baked at 100° C. to give a positive electrode active material 2 ($LiNi_{2/3}Mn_{1/3}O_2$) (Comparative Example 1). It was confirmed, from the powder X-ray diffraction pattern, that the positive electrode active material 2 had a layered structure. EPMA revealed that the degree of dispersion of nickel and manganese of the positive electrode active material 2 was apparently lower than that of the positive electrode active material of Example 1. For further comparison, a positive electrode active material ($LiCoO_2$) of a commercially available battery was used as Comparative Example 2, which hereinafter is referred to as positive electrode active material 3.

[Evaluation]

(i) Excessive Amount of Li

Coin type batteries were produced by using the obtained positive electrode active materials, and the electrochemical characteristics of the positive electrode active materials were evaluated. The positive electrode active material, acetylene black as electrically conductive material, and polyvinylidene fluoride resin (PVDF) as binder were mixed in a weight ratio of 80:10:10, and a sheet-like molded article was obtained. This molded article was punched out into a disk, which was then dried at 80° C. in a vacuum for about 15 hours to give a positive electrode. Likewise, a negative electrode was obtained by punching out a lithium metal, which was molded into a sheet, into a disk. A microporous film made of polyethylene was used as separator, and an electrolyte was prepared by dissolving 1 mol of $LiPF_6$ into a solvent mixture of EC (ethylene carbonate) and EMC (ethyl methyl carbonate) at a volume ratio of 1:3. Coin type batteries 1 to 3 having a size of 2016 (diameter: 20 mm, thickness: 1.6 mm) were fabricated by using the above materials by means of conventional method.

Each of the produced coin type batteries 1 to 3 was charged at a constant current value corresponding to one hour rate (1 C) to 4.3 or 4.9 V. Then, by the difference between the capacity in the case of 4.3 V and that in the case of 4.9 V, the amounts of the lithium to be released from the positive electrode active material and to be deposited on the negative electrode (excessive amount of Li) were calculated in terms of capacity. The results are shown in Table 1.

TABLE 1

| | Positive electrode active material used | Capacity (mAh/g) 4.3 V | Capacity (mAh/g) 4.9 V | Excessive amount of Li (mAh/g) |
|---|---|---|---|---|
| Ex. 1 | $LiNi_{2/3}Mn_{1/3}O_2$ (Ni and Mn even dispersion) | 150 | 180 | 30 |
| Comp. Ex. 1 | $LiNi_{2/3}Mn_{1/3}O_2$ (Ni and Mn uneven dispersion) | 132 | 193 | 61 |
| Comp. Ex. 2 | $LiCoO_2$ | 145 | 250 | 105 |

Table 1 illustrates that the use of the positive electrode active material of the present invention greatly reduces the amount of lithium released, thus effectively reducing the lithium deposits on the negative electrode in the battery.

(ii) Battery Surface Temperature

There is the problem that, when the amount of lithium deposits on the negative electrode is increased, the lithium deposits react with an electrolyte to generate reaction heat, which leads to a rise of the battery surface temperature. In view of this, cylindrical batteries as shown in FIG. 6 were fabricated using the positive electrode active materials 1 to 3; each of the batteries were continuously overcharged; and the battery surface temperature was measured.

The positive electrode plate was produced as follows. 10 parts by weight of carbon powder as electrically conductive material and 5 parts by weight of polyvinylidene fluoride resin as binder were mixed with 85 parts by weight of the positive electrode active material powder of the present invention. The resultant mixture was dispersed in dehydrated N-methyl pyrrolidinone to give a slurry; the slurry was applied onto the positive electrode current collector made of aluminum foil, which was then dried, rolled out and cut into a specified size to form a positive electrode plate.

The negative electrode plate was obtained by applying a mixture of a carbonaceous material as main material and styrene butadiene rubber binder at a weight ratio of 100:5 onto the both surfaces of a copper foil, followed by drying, rolling out and cutting into a specified size.

For the separator, a microporous film made of polyethylene was used. For the organic electrolyte, an organic electrolyte obtained by dissolving $LiPF_6$ into a solvent mixture of ethylene carbonate and ethyl methyl carbonate at a volume ratio of 1:1 at 1.5 mol/liter was used. The cylindrical battery produced had a diameter of 18 mm and a height of 650 mm.

The cylindrical batteries 1 to 3 as obtained above were continuously overcharged at a constant current value corresponding to ⅓ hour rate (3 C) for one hour, respectively; thereafter, the highest temperature of the battery surface was measured. The results are shown in Table 2.

TABLE 2

| | Positive electrode active material used | Highest surface temperature (°C.) |
|---|---|---|
| Ex. 1 | $LiNi_{2/3}Nn_{1/3}O_2$ (Ni and Mn even dispersion) | 120-125 |
| Comp. Ex. 1 | $LiNi_{2/3}Mn_{1/3}O_2$ (Ni and Mn uneven dispersion) | 135-140 |
| Comp. Ex. 2 | $LiCoO_2$ | 140-148 |

Table 2 illustrates that the highest surface temperature of the battery using the positive electrode active material of the present invention is much lower than that of the batteries using other positive electrode active materials. Presumably, this is because the amount of lithium released from the positive electrode active material of the present invention is small and the amount of lithium deposits on the negative electrode is small, and the reaction between the lithium and electrolyte does not generate much heat.

INDUSTRIAL APPLICABILITY

As described above, in the positive electrode active material of the present invention, an inexpensive lithium-containing transition metal oxide can be effectively used, and it is also possible to provide a secondary battery in which the amount of lithium to be released is small and the amount of deposits is small and the battery surface temperature does not increase so much.

The invention claimed is:

1. A positive electrode active material comprising crystal particles of an oxide having a layered single-phase crystal structure and a composition represented by the formula (1):

$LiNi_{2/3}Mn_{1/3}O_2$, wherein the arrangement of oxygen atoms constituting the oxide is a cubic close-packed structure, the nickel and manganese are incorporated in said crystal particles at the atomic level, wherein the arrangement of nickel element and manganese element is a superlattice arrangement of a [√3×√3] R30° in the layer, of said crystal particles, in which nickel element and manganese element exist in a ratio of 2:1, and the crystal particles are doped with a different element, wherein the concentration of said different element is higher at the surface of said crystal particles than inside said crystal particles.

2. The positive electrode active material in accordance with claim 1, wherein the crystal structure of said oxide is a layered structure belonging to R-3m.

3. The positive electrode active material in accordance with claim 1, wherein the volume of the unit lattice of said crystal particles does not increase by an oxidation.

4. The positive electrode active material in accordance with claim 1, wherein the error range of the ratio of said Ni and Mn is within 10 atom %.

5. The positive electrode active material in accordance with claim 1, wherein said different element is at least one selected from the group consisting of aluminum, magnesium, calcium, strontium, yttrium and ytterbium.

6. The positive electrode active material in accordance with claim 1, wherein the added amount of said different element is 0.05 to 20 atom % of the total amount of the Ni and Mn.

7. The positive electrode active material in accordance with claim 1, wherein said crystal particles comprise a mixture of crystal particles of the oxide with a particle size of 0.1 to 2 μm and secondary particles of the crystal particles with a particle size of 2 to 20 μm.

8. A non-aqueous electrolyte secondary battery comprising a negative electrode containing, as a negative electrode active material, a material capable of absorbing and desorbing lithium ions and/or lithium metal, a positive electrode containing a positive electrode active material comprising crystal particles of an oxide having a layered single-phase crystal structure and a composition represented by the formula (1):

$LiNi_{2/3}Mn_{1/3}O_2$, characterized in that the arrangement of oxygen atoms constituting the oxide is a cubic close-packed structure, and an electrolyte, the nickel and manganese are incorporated in said crystal particles at the atomic level, and the crystal particles are doped with a different element, wherein the concentration of said different element is higher at the surface of said crystal particles than inside said crystal particles, and the arrangement of nickel element and manganese element is a superlattice arrangement of a [√3×√3] R30° in the layer, of said crystal particles, in which nickel element and manganese element exist in a ratio of 2:1.

9. A non-aqueous electrolyte secondary battery in accordance with claim 8, wherein, when said battery is continuously overcharged at a constant current value corresponding to a ⅓ hour rate (3C) for an hour, a highest surface temperature of the battery is 125° C. or lower.

10. The non-aqueous electrolyte secondary battery in accordance with claim 8, wherein said crystal particles comprise a mixture of crystal particles of the oxide with a particle size of 0.1 to 2 pm and secondary particles of the crystal particles with a particle size of 2 to 20 μm.

11. A positive electrode active material comprising crystal particles of an oxide having a layered single-phase crystal structure and a composition represented by the formula (1):

$LiNi_{2/3}Mn_{1/3}O_2$, wherein the arrangement of oxygen atoms constituting the oxide is a cubic close-packed structure, the nickel and manganese are incorporated in said crystal particles at the atomic level, said crystal particles comprise a mixture of crystal particles of the oxide with a particle size of 0.1 to 2 μm and secondary particles of the crystal particles with a particle size of 2 to 20 μm, and the arrangement of nickel element and manganese element is a superlattice arrangement of a [√3×√3] R30° in the layer, of said crystal particles, in which nickel element and manganese element exist in a ratio of 2:1.

12. The positive electrode active material in accordance with claim 11, wherein the crystal structure of said oxide is a layered structure belonging to R-3m.

13. The positive electrode active material in accordance with claim 11, wherein the volume of the unit lattice of said crystal particles does not increase by an oxidation.

14. The positive electrode active material in accordance with claim 11, wherein the error range of the ratio of said Ni and Mn is within 10 atom %.

15. The positive electrode active material in accordance with claim 11, wherein the surface of said crystal particles is doped with a different element.

16. The positive electrode active material in accordance with claim 15, wherein said different element is at least one selected from the group consisting of aluminum, magnesium, calcium, strontium, yttrium and ytterbium.

17. The positive electrode active material in accordance with claim 15, wherein the added amount of said different element is 0.05 to 20 atom % of the total amount of the Ni and Mn.

* * * * *

UNITED STATES PATENT AND TRADEMARK OFFICE
CERTIFICATE OF CORRECTION

PATENT NO. : 7,816,036 B2  
APPLICATION NO. : 10/250647  
DATED : October 19, 2010  
INVENTOR(S) : Tsutomu Ohzuku et al.

Page 1 of 1

It is certified that error appears in the above-identified patent and that said Letters Patent is hereby corrected as shown below:

IN THE CLAIMS:

In Column 20, Line 16 (Claim 10), please change "0.1 to 2 pm" to --0.1 to 2 µm--.

Signed and Sealed this  
Twenty-sixth Day of April, 2011

David J. Kappos  
*Director of the United States Patent and Trademark Office*